Oct. 23, 1956  H. A. STEWART  2,767,750
LOG BARKER HAVING REVOLVING AND ROTATING SPRING-PRESSED
CONE-SPREAD BARK-REMOVING TOOLS
Filed May 23, 1955  2 Sheets-Sheet 1
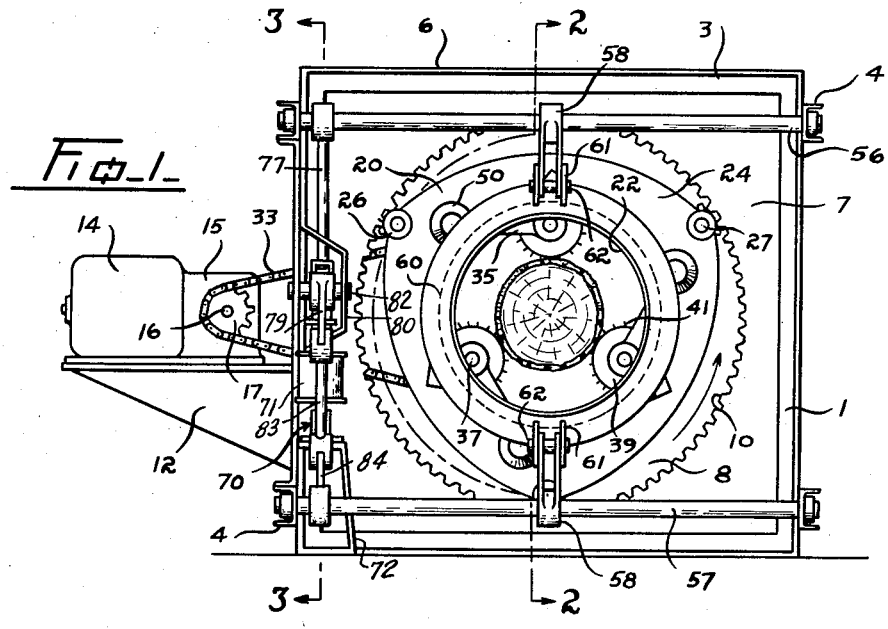
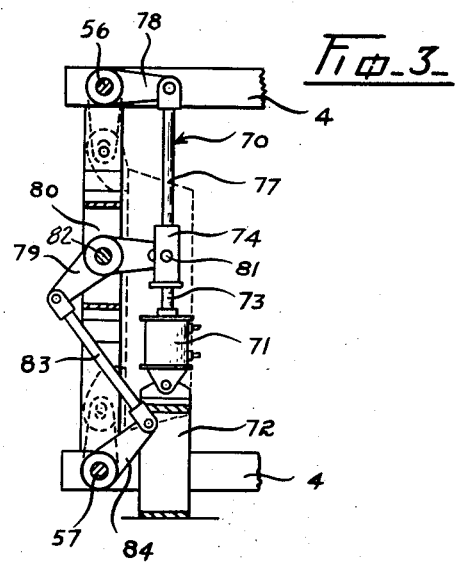
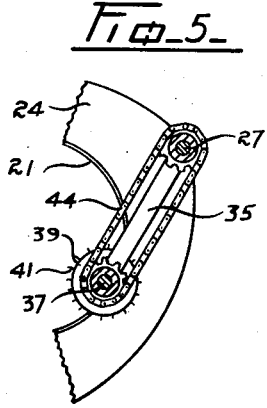
INVENTOR
HARRY A. STEWART
ATTORNEY

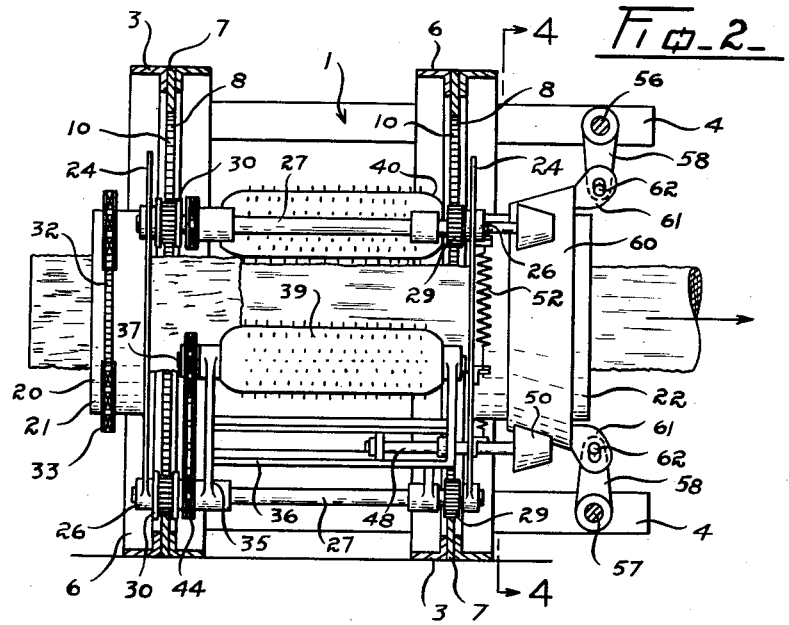
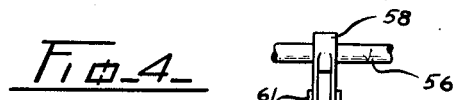
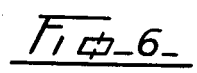

United States Patent Office 2,767,750
Patented Oct. 23, 1956

2,767,750

LOG BARKER HAVING REVOLVING AND ROTATING SPRING-PRESSED CONE-SPREAD BARK-REMOVING TOOLS

Harry A. Stewart, Vancouver, British Columbia, Canada

Application May 23, 1955, Serial No. 510,361

4 Claims. (Cl. 144—208)

My invention relates to improvements in log barkers.

The objects of the invention are to provide a barker having log-debarking elements carried within a rotor and adapted to be driven by rotation of the rotor within the stator, so that one motor only is required; to provide means for simultaneously adjusting the elements to any desired spacing by the use of a single control, and to provide a simple spring arrangement whereby each debarking element is applied to the log with equal operating pressure.

Referring to the accompanying drawings:

Figure 1 is an elevation of the log-discharge end of a debarker which incorporates my invention.

Figure 2 is a vertical, longitudinal sectional view taken on the line 2—2 of Figure 1.

Figure 3 is a fragmentary, vertical, longitudinal sectional view taken on the line 3—3 of Figure 1 showing the operating mechanism for adjusting the setting of the log-debarking elements, and includes a projection in phantom outline of a truncated collar which is axially shifted by said operating mechanism.

Figure 4 is a fragmentary, vertical, transverse sectional view taken on the line 4—4 of Figure 2 showing the truncated collar engaged by rollers.

Figure 5 is a fragmentary view schematically showing a chain-and-sprocket drive for a debarking element.

Figure 6 is a fragmentary, vertical transverse section on a plane corresponding to the section line 4—4 of Fig. 2, but looking in the opposite direction, and shows a spring means for urging the element towards the center of the rotor.

In the drawings like characters of reference indicate corresponding parts in each figure.

The numeral 1 indicates generally a stator having spaced transverse members 3 which are connected by longitudinal members 4. The members 3 are made up of square frames 6 preferably of angle iron, which frames support between them plates 7 having aligned openings 8. An internal ring gear 10 is provided on the inner peripheral edge of each plate 7. A bracket 12 is provided on one side of the stator and mounted thereon is a motor 14 and reduction gear 15 having a drive shaft 16 fitted with a sprocket 17.

Journaled in the stator 1 is a rotor unit 20 consisting of aligned horizontal sleeves 21 and 22 each having a radial flange 24. Spaced one hundred and twenty degrees about the circumference of the flanges 24 are aligned bearings 26 in which horizontal shafts 27 are journaled so as to connect the sleeves rigidly together. Each shaft is fitted with a pair of pinions 29 which mesh with the ring gears 10 of the stator and at least one of each pair of pinions is provided with side flanges as shown at 30 in Figure 2, which flanges serve to prevent endwise movement of the rotor within the stator. A sprocket ring 32 is fitted to the sleeve 21, see Figure 2, and is connected by a chain 33 to the sprocket 17 on the drive shaft 16. Thus the motor 14 is adapted to rotate the rotor unit 20 within the stator.

Swingingly mounted upon each shaft 27 is a pair of arms 35 which are connected by spaced parallel bars 36. A swinging shaft 37 is journaled at the free ends of each pair of arms, and keyed to said shaft so as to rotate therewith is a cylindrical bark-removing element 39 which is rounded at its ends as at 40 and is provided on its periphery with a plurality of cutters 41. Each of the shafts 37 are chain and sprocket connected as at 44, see Figures 2 and 5, to the shaft 27, so that as the shafts 27 are driven by the rotation of the rotor, the elements 39, which obviously trail said shafts 27, are rotated at a corresponding speed and in a direction counter to that of said rotor. A short shaft 48 is journaled between the parallel bars 36 of each pair of arms 35 and said shaft projects outwardly through an arcuate slot 49 formed in the adjoining flange 24, see Figure 6. Fitted to the free end of each shaft 48 is a conical roller 50, and a spring 52 connects said shaft to a bracket 53 secured to the flange 24.

The longitudinal members 4 of the stator extend rearwardly and journal between them upper and lower shafts 56 and 57 which are each fitted with a centrally disposed crank 58. A truncated conical collar 60 is slidably mounted for axial movement only upon the sleeve 22 of the rotor and is provided with rearwardly extending forked brackets 61 which are operatively connected by pins 62 to the adjacent cranks 58. The conical rollers are held in engagement with the conical periphery of the collar 60 by means of the springs 52 which also urge the elements 39 towards the center of the barker and against the periphery of a log.

A control mechanism generally indicated by the numeral 70 and shown particularly in Figure 3 is provided to move the truncated collar endwise of the sleeve 22 as required. The mechanism consists of a hydraulic cylinder 71 which is swingingly mounted upon a base 72 and has a piston rod 73 fitted with a fork 74. A rod 77 operatively connects the fork 74 to the end of a crank 78 secured to the upper shaft 56. A bell crank 79 is rockingly mounted by means of a trunnion 82 which is journaled in spaced arms of a vertical bracket 80 supported between the rearward extensions of two of the members 4 of the stator, and the inner end of said crank is connected as at 81 to the fork 74. The lower end of the bell crank 79 is pivotally connected by a link 83 to a crank 84 secured to the lower shaft 57. The cylinder 71 is provided with a suitable fluid-pressure control, not shown, by which the barker operator actuates the control mechanism 70 to move the truncated collar endwise of the rotor. Movement of the collar to its forward or innermost position will swing the arms 35 about their shafts 27 and dispose the bark-removing elements 39 in the dotted line position shown in Figure 6 and movement of said collar to its rearward or outermost position will allow the springs 52 to swing the elements towards the center of the barker or to the solid line position shown in Figure 6.

The barker is provided with a suitable conveyor, not shown, upon which the logs to be debarked are non-rotatably held. With the conveyor in motion and the motor 14 driving the rotor at an appropriate speed the operator actuates the control mechanism 70 to position the elements 39 so that the approaching log may enter therebetween. The elements are then swung into engagement with the log so that the bark is stripped therefrom down to the cambium layer of the wood. The bark-removing elements, being held against the periphery of a log by spring tension, may swing clear of any obstruction encountered upon the log surface and will immediately reengage the log behind the obstruction so that no part of said log remains unbarked.

What I claim as my invention is:

1. A log barker comprising a stator having spaced transverse members and aligned openings provided each with an internal ring gear, a rotor unit mounted to rotate within the openings, said unit comprising a pair of aligned sleeves rotatable as a unit about a comon axis, and each having an annular flange connected in spaced relation by a plurality of shafts, each of said shafts having secured upon its ends pinions mounted so as to mesh the internal ring gears, pairs of arms swingingly mounted upon each of said shafts, a rotary debarking element carried by each pair of arms, means for rotating the rotor unit, and means for rotating the debarking elements from the shafts as the shafts are rotated by the pinions meshing the internal ring gears, and means for urging the debarking elements away from the axis of the sleeves.

2. A log barker as claimed in claim 1, said means for urging the debarking elements away from the axis of the sleeves comprising a truncated conical collar surrounding one of the sleeves, said rotor unit having a plurality of complementary rollers adapted to ride around said truncated collar, said rollers being mounted to swing in unison with the swinging arms and said collar being supported for endwise movement on said one sleeve, and means for moving said truncated collar endwise so as to spread the debarking elements.

3. A log barker comprising a stator having spaced transverse members and aligned openings provided each with an internal ring gear, a rotor unit mounted to rotate within the openings, said unit comprising a pair of aligned sleeves each having an annular flange connected in spaced relation by a plurality of shafts, each of said shafts having secured upon its ends pinions mounted so as to mesh the internal ring gears, pairs of arms swingingly mounted upon each of said shafts, a rotary debarking element carried by each pair of arms, a sprocket upon each shaft and chain-and-sprocket means operatively connecting each sprocket with a debarking element whereby the rotation of the rotor unit causes rotation of the pinions and the debarking elements.

4. A log barker comprising a stator formed of spaced transverse members each having a circular opening forming an internal ring gear, a rotor consisting of a pair of sleeves spaced apart and fitted with pinions in mesh with the internal ring gears, means for rotating the rotor, a plurality of bark-removing elements swingingly mounted around the sleeve to engage a log passing through the sleeves, a spreading media endwise movable along one of said sleeves for swinging the bark-removing elements outwardly, and hydraulic means for imparting endwise movement to the spreading media, and means for normally applying working pressure to the bark-removing elements to engage such log.

References Cited in the file of this patent

UNITED STATES PATENTS

| | | |
|---|---|---|
| 2,591,751 | Whitlock | Apr. 8, 1952 |
| 2,646,092 | Kolpe et al. | July 21, 1953 |